US010595551B2

(12) United States Patent
Yadav et al.

(10) Patent No.: US 10,595,551 B2
(45) Date of Patent: Mar. 24, 2020

(54) INSOLUBLE BIOMASS GEL (IBG) AND METHODS OF PREPARING

(71) Applicants: The United States of America, as represented by the Secretary of Agriculture, Washington, DC (US); Z-Trim Holdings Inc., Mundelein, IL (US)

(72) Inventors: Madhav P. Yadav, North Wales, PA (US); Kevin B. Hicks, Malvern, PA (US); David Johnston, Wyndmoor, PA (US); Kyle A. Hanah, Mount Prospect, IL (US); Madhuvanti S. Kale, Flourtown, PA (US)

(73) Assignees: The United States of America, as represented by the Secretary of Agriculture, Washington, DC (US); AgriFiber Holdings LLC, Mundelein, IL (US)

( * ) Notice: Subject to any disclaimer, the term of this patent is extended or adjusted under 35 U.S.C. 154(b) by 617 days.

(21) Appl. No.: 14/745,927

(22) Filed: Jun. 22, 2015

(65) Prior Publication Data
US 2015/0366244 A1 Dec. 24, 2015

Related U.S. Application Data

(60) Provisional application No. 62/016,186, filed on Jun. 24, 2014.

(51) Int. Cl.
*A23L 29/262* (2016.01)
*C08H 8/00* (2010.01)

(52) U.S. Cl.
CPC .............. *A23L 29/262* (2016.08); *C08H 8/00* (2013.01)

(58) Field of Classification Search
CPC ............................ A23L 1/0534; A23L 29/262
See application file for complete search history.

(56) References Cited

U.S. PATENT DOCUMENTS

| 5,057,334 | A | 10/1991 | Vail |
| 5,766,662 | A | 6/1998 | Inglett |
| 6,352,845 | B1 * | 3/2002 | Buchanan ............... A23D 9/007 435/105 |
| 6,482,430 | B1 * | 11/2002 | Weightman ............ A21D 2/265 424/439 |
| 6,902,649 | B1 | 6/2005 | Satyavolu et al. |
| 7,625,591 | B2 | 12/2009 | Shukla |
| 7,837,830 | B2 | 11/2010 | Satyavolu et al. |
| 8,308,901 | B2 | 11/2012 | Anderson et al. |
| 2010/0303953 | A1 * | 12/2010 | Hamaker ............... A23K 10/30 426/2 |

* cited by examiner

*Primary Examiner* — Michele L Jacobson
*Assistant Examiner* — Philip A Dubois
(74) *Attorney, Agent, or Firm* — G. Byron Stover; John D. Fado

(57) ABSTRACT

Processes for the preparation of an insoluble biomass gel involving:
(a) mixing ground agricultural materials and hexane to produce de-oiled agricultural materials,
(b) treating the de-oiled agricultural materials with thermostable α-amylase to produce de-oiled and de-starched agricultural materials,
(c) mixing alkali with the de-oiled and de-starched agricultural materials to produce a first residue,
(d) mixing hydrogen peroxide with the first residue to form a second residue, and
(e) mixing the second residue in water and collecting an insoluble material which is an insoluble biomass gel.

12 Claims, 1 Drawing Sheet

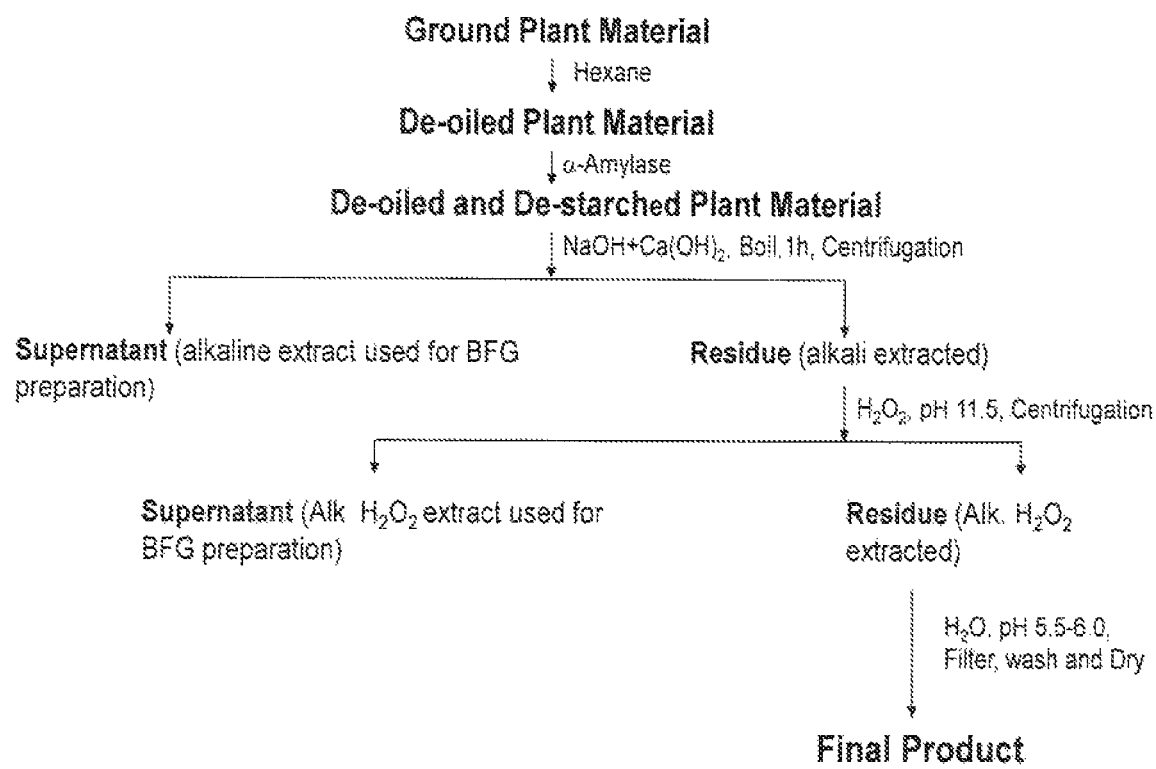

INSOLUBLE BIOMASS GEL (IBG) AND METHODS OF PREPARING

REFERENCE TO RELATED APPLICATION

This application claims the benefit of U.S. Provisional Application No. 62/016,186, filed 24 Jun. 2014, which is incorporated herein by reference in its entirety.

BACKGROUND OF THE INVENTION

Processes for the preparation of an insoluble biomass gel are disclosed involving:
(a) mixing ground agricultural materials and hexane to produce de-oiled agricultural materials,
(b) treating the de-oiled agricultural materials with thermostable α-amylase to produce de-oiled and de-starched agricultural materials,
(c) mixing alkali with the de-oiled and de-starched agricultural materials to produce a first residue,
(d) mixing hydrogen peroxide with the first residue to form a second residue, and
(e) mixing the second residue in water and collecting an insoluble material which is an insoluble biomass gel.

Agricultural processing byproducts (e.g., sorghum bran, corn bran, corn fiber, rice fiber, rice hulls, pea fiber, barley hulls, oat hulls, soybean hulls, sugar cane bagasse, carrot pomace, psyllium husk, etc.) contain numerous components that could be valuable co-products if they could be economically isolated. Agricultural residues (e.g., corn stover, wheat straw, rice straw, barley straw etc.,) and energy crops (e.g., sorghum bagasse, biomass sorghum, switchgrass, miscanthus, etc.) may also be abundant and inexpensive sources for many valuable coproducts. Such lignocellulosic materials rich in lignocellulose are abundant and renewable biological resources. These lignocellulosic materials are natural composites consisting of three main polymeric components: cellulose, hemicellulose, and lignin, as well as other minor components such as extractives (e.g., phenolics, lipids, etc.), pectin, or protein (Zhang, Y.-H. P., and L. R. Lynd, Biotechnol. Bioeng., 88: 797-824 (2004); Fengel, D., and G. Wegener, Wood: Chemistry, Ultrastructure, Reactions; Walter de Gruyter & Co., Berlin, 1984). Lignocellulosic byproducts are the source of many valuable bio-based products which can be used in several industries. Fibers from lignocellulosic sources have various applications, such as building materials, particle board, human food, animal feed, cosmetics, medicine and many other applications (Reddy, N., and Y. Yang, Trends in Biotechnology, 23: 22-27 (2005)). It is becoming important to develop consumer products from the above mentioned renewable resources. The isolation of cellulose suitable for human consumption from agricultural processing byproducts (e.g., soy hulls, sugar beet pulps, pea hulls, corn bran, etc.) has been reported (U.S. Pat. Nos. 4,486,459; 5,057,334). Corn fiber/bran, a renewable resource available in huge quantities, can be a good source of valuable consumer products. Corn fiber makes up about 5 to 10 wt. % portion of the total weight of the corn kernel. It is made up of a number of valuable components which if extracted economically can be commercially valuable. Corn fiber consists primarily of residual starch (10 to 20 wt. %), hemicelluloses (40 to 50 wt. %), cellulose (15 to 25 wt. %), phenolic compounds (3 to 5 wt. %), protein (5 to 10 wt %), and some oils (Wolf, M. J., et al., Cereal Chemistry, 30, 451-470 (1953); Chanliaud, E., et al., J. Cereal Science, 21:195-203 (1995)). The variations in the fiber composition are believed to be due to corn plant variety and growth conditions as well as isolation methods used.

After removing the commercially valuable component "hemicelluloses" from, for example, corn fiber, we isolated and purified the insoluble residue. Based on our studies, this residue, called "Insoluble Biomass Gel" (IBG), has a unique water holding capacity and could be used, for example, as a food bulking agent and thickener.

SUMMARY OF THE INVENTION

Processes for the preparation of an insoluble biomass gel involving:
(a) mixing ground agricultural materials and hexane to produce de-oiled agricultural materials,
(b) treating the de-oiled agricultural materials with thermostable α-amylase to produce de-oiled and de-starched agricultural materials,
(c) mixing alkali with the de-oiled and de-starched agricultural materials to produce a first residue,
(d) mixing hydrogen peroxide with the first residue to form a second residue, and
(e) mixing the second residue in water and collecting an insoluble material which is an insoluble biomass gel.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 1 shows a generic scheme to produce insoluble biomass gel as described below.

DETAILED DESCRIPTION OF THE INVENTION

Disclosed herein are processes for the preparation of an insoluble biomass gel involving:
(a) mixing ground agricultural materials and hexane to produce de-oiled agricultural materials,
(b) treating the de-oiled agricultural materials with thermostable α-amylase to produce de-oiled and de-starched agricultural materials,
(c) mixing alkali with the de-oiled and de-starched agricultural materials to produce a first residue,
(d) mixing hydrogen peroxide with the first residue to form a second residue, and (e) mixing the second residue in water and collecting an insoluble material which is an insoluble biomass gel.

Insoluble biomass gels (IBG) were generally produced as follows: Plant materials were dried in an oven at about 75° C., ground (e.g., to about 20-mesh particle size using a Wiley mill), and extracted with hexane by stirring its suspension at room temperature for about one hour to remove oil. After filtering the suspension, the residue was dried (e.g., first in a chemical hood and then in a vacuum oven) at about 50° C. to completely evaporate hexane (Moreau et al., Journal of Agricultural and Food Chemistry, 44: 2149-2154 (1996)). Starch present in the de-oiled materials was removed by treating them with heat stable termamyl α-amylase (Novozymes, Inc., Davis, Calif.) at a temperature of about 90° to about 95° C. and pH of about 6.5 for about 1 h (Doner et al., Cereal Chemistry, 75 (4): 408-411 (1998)). In brief: The de-oiled material was suspended in hot water at about 95° C. with mechanical stirring. The pH of the suspension was adjusted to about 6.5 and the α-amylase was added to it. The pH was re-checked and adjusted to about 6.5 by adding acid or base as needed. The heating and stirring was continued for about one hour. After one hour the mixture was cooled to room temperature and filtered (e.g., by vacuum filtration). The residue was washed with water to remove maltodextrin (degradation product of starch) until the filtrate looked clear. The residue was rinsed with ethanol and dried (e.g., in an oven) at about 60° C. The arabinoxylan, covalently linked to the cell wall of de-oiled and de-starched plant materials, was solubilized with a mixture of alkali; de-oiled and de-starched plant material was mechanically stirred in water, and alkali (e.g., KOH, $NH_4OH$, NaOH, $Ca(OH)_2$) was added. The mixture was boiled with good stirring for about 1 h. After cooling, the reaction mixture was centrifuged at about 6000 g for about 20 min. and the supernatant was separated (e.g., by decantation). The alkali insoluble residue (cellulose rich fraction) was re-suspended in water and stirred by using a mechanical stirrer. The pH was adjusted to about 11.5 by adding NaOH. Hydrogen peroxide was added to the suspension and heated with continued stirring at pH of about 11.5 and about 100° C. temperature for about half an hour. During the half hour reaction, the pH was kept at about 11.5 by adding more NaOH as needed. After cooling the hot reaction mixture by stirring at room temperature for about an additional half hour, it was centrifuged at about 6000×g for about 20 min and the residue (insoluble cellulosic fraction) was collected. The residue was suspended in water and stirred for about 10 minutes. The insoluble material was collected by centrifugation as above. It was re-suspended in water, pH adjusted to about 5.5 to about 6, and stirred at room temperature for about 15 minutes to remove water soluble impurities. The insoluble material was collected (e.g., by a vacuum filtration). The final white product collected was washed 3 times with water, 1 time with 100% ethanol, and dried (e.g., in a vacuum oven) at about 50° C. for about two days.

As noted above, after removing the commercially valuable component "hemicellulose" from, for example, corn fiber, the insoluble residue can be isolated, purified and its functionalities can be tested for commercial uses. Based on our studies, this residue, called "insoluble biomass gel" (IBG), had a unique water holding capacity and can be used, for example, as a food bulking agent and thickener.

The IBG obtained during hemicellulose isolation from agricultural residues, agricultural processing byproducts and energy crops (such as sweet sorghum bagasse, biomass sorghum, switchgrass, miscanthus, etc.) have a similar water binding capacity leading to its application in the food industry as an insoluble dietary fiber and/or as a bulking agent. Such water-holding behavior of polymers is important for their functional roles in foods. Water holding capacity is closely linked to the nature of the gel network and its homogeneity, and there is much variation when comparing these cellulosic materials from various sources of biomass. Such polymers have a significant market in food industries for making food gels. The term water-holding capacity is used to mean the amount of water retained by food materials in such a way that its exudation is prevented. The ability of fiber to hold water provides bulk and, when consumed, may cause a feeling of satiety without providing excessive calories. Thus in treating obesity, high fiber diets are recommended. Dietary fiber has also been shown to slow down gastric emptying and nutrient absorption may take place over a longer period. The water-holding capacity of dietary fiber has been proposed to be valuable in the diet to alter stool bulking (Gray, H., and M. L. Tainter, Am. J. Dig. Dis. 8: 130-139 (1941)). Increased stool weight can cause shorter gut transit times limiting the exposure of the gut to toxins (Faivre, J., et al., Eur. J. Cancer Prevent., 1: 83-89 (1991); Reddy, B. S., et al., Cancer Res., 49: 4629-4635 (1989)). The compounds considered dietary fiber are generally split into two groups: water soluble and water insoluble. Gums, pectins, mucilages and hemicelluloses fall into the category of soluble fiber. Cellulose and lignin are considered insoluble. Fiber ingredients come from a number of sources and typically contain a mixture of soluble and insoluble fiber. Most fiber ingredients, especially insoluble forms, are derived from plants: grains like corn, wheat, soy and oats; legumes; fruit; and even trees. Purified cellulose fibers derived from a variety of sources are commonly used in bulking and calorie-reduction applications, but other types of fibers may provide different functional or physiological benefits. It is common to combine different sources of fiber to get the finished product characteristics we need. One of the main reasons is mouthfeel. Excess levels of one kind of fiber may produce an unacceptable "mouth feel" A bulking agent is an additive that contributes solids to provide texture/palatability and it increases the bulk of a food without affecting its nutritional value. Bulking agents are non-caloric additives used to impart volume and mass to a food. Water soluble dietary fibers (e.g., guar gum, xanthan gum, gum Arabic, carboxymethyl cellulose, other cellulose derivatives, etc.) are common forms of bulking agents. Gum arabic has been used in dietetic foods as a noncaloric bulking agent in special-purpose foods for diabetics. A mixture of gum arabic and xanthan gum has been used in the preparation of reduced-fat products such as butter, margarine, toppings, spreads, and frozen desserts. Bulking agents can be used to partially or completely replace high-caloric ingredients, such as sugar and/or flour, so as to prepare an edible formulation with a reduction in calories. Bulking agents are also useful as a source of soluble and/or insoluble fiber to be incorporated into foods and, unlike sucrose, are non-cariogenic, thus preventing tooth decay (U.S. Pat. No. 5,811,148; Voragen, A. G. J., Trends Food Sci. Technol., 9:328-335 (1998)). IBG is a bulking agent due to its high water holding capacity, it increases the volume of the product in which it is added but it does not provide calories.

This invention relates to substantially non-digestible bulking agents (i.e., IBG) for use in edible formulations and processes for preparing these agents. Bulking agents can be used to partially or completely replace high-caloric ingredients, such as sugar and/or flour so as to prepare an edible formulation with a reduction in calories. Also, the bulking agents are useful as a source of soluble and insoluble fiber to be incorporated into foods and, unlike sucrose, are non-cariogenic. Among the edible formulations which may include the bulking agents are: baked goods; puddings, creams and custards; jams and jellies; confections; soft drinks and other sweetened beverages, in liquid or dry form; sauces and salad dressings; ice cream and frozen desserts; foods which are sweetened; tabletop sweeteners and pharmaceuticals. The bulking agents herein may be employed alone, or as mixtures, in any edible formulation. The nature of the edible formulation will direct the selection of an appropriate bulking agent from those disclosed herein. The edible formulation may be liquid or dry, may be heat processed or frozen or refrigerated, and may contain appropriate high potency sweeteners. The bulking agents are stable to the temperature, oxygen content, enzymatic activity and pH conditions normally observed in the manufacture and storage of foods, pharmaceuticals and other edible formulations.

Physical properties of IBG: IBG was characterized by surprisingly high water holding capacity, holding several grams of water per gram sample (Table 3). For instance, IBG from corn bran held nearly 75 g of water per gram, while IBG prepared from sugarcane bagasse held 21 g of water per gram. IBG suspensions surprisingly showed very high viscosity even at low concentrations, they also showed shear thinning behavior (Table 5) which contributes to ease of processing since the material showed low viscosity during pumping in spite of the high viscosity at rest and at low shear rates. It is noteworthy that pumping itself surprisingly did not cause the suspension to lose any viscosity, and the suspension was also stable over a wide range of temperature and pH values. The uniquely high water holding capacity and viscosity enables numerous food applications of IBG, such as in sauces, dressings, baked products, meat products, dairy products, etc. In these and other food systems, IBG can help to build viscosity, replace fat, control moisture migration, and impart freeze-thaw stability. IBG suspensions have a smooth, non-gritty texture which makes them excellent fat replacers, helping in the development of reduced or zero calorie formulations that maintain the body and texture of the original product. IBG can also function as a good emulsion stabilizer in food systems such as meat products as well as non-food systems such as oil drilling fluids.

Chemical properties of IBG: IBG was rich in non-digestible carbohydrates, with very low starch content (Table 2). This makes it a rich source of insoluble dietary fiber, enabling its potential use as a dietary fiber in food applications. The carbohydrate in IBG mainly consisted of glucose, xylose and arabinose (Table 6). The xylose and arabinose were present in the form of a highly branched arabinoxylan with a $\beta$-1,4 linked xylan backbone. The glucose polymer was mainly $\beta$-1,4 linked, indicating a cellulose-like polymer. However, there was a surprising amount of branching present in the glucose polymer in corn bran IBG (Table 7) which implies that this polymer is significantly different from cellulose, marking a major departure from current understanding of corn bran compositions. Without being bound by theory, the branching on the glucose polymer may be partly responsible for the high water holding capacity of the IBG since it would decrease polymer crystallinity and afford more sites for water binding than cellulose. IBG also had antioxidant capacity as evidenced by the ORAC value (Table 4) which ranges from 730 µmole Trolox/100 g for IBG from barley hulls to 1070 µmole Trolox/100 g for IBG from Miscanthus; this implies that IBG can offer significant health benefit as a source of antioxidants.

Thus, the unique physical and chemical properties of IBG will enable it to be used in a wide variety of food and non-food applications requiring wide-ranging functionalities, while also offering ease of use and consistency.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Preparation of insoluble biomass gel (IBG): The plant materials were dried in an oven at 75° C., ground to a 20-mesh particle size using a Wiley mill, and extracted with hexane by stirring its suspension at room temperature for one hour to remove oil. After filtering the suspension, the residue was dried first in a chemical hood and then in a vacuum oven at about 50° C. to completely evaporate hexane (Moreau et al., Journal of Agricultural and Food Chemistry, 44: 2149-2154 (1996)). Starch present in the de-oiled materials was removed by treating them with heat stable termamyl $\alpha$-amylase (Novozymes, Inc., Davis, Calif.) at a temperature of 90° to 95° C. and pH 6.5 for 1 h (Doner et al., Cereal Chemistry, 75 (4): 408-411 (1998)). In brief: The de-oiled material was suspended in hot water at about 95° C. with mechanical stirring. The pH of suspension was adjusted to 6.5 and the $\alpha$-amylase was added to it. The pH was re-checked and adjusted to 6.5 by adding acid or base as needed. The heating and stirring was continued for one hour. After one hour the mixture was cooled to room temperature and filtered by vacuum filtration. The residue was washed with water to remove maltodextrin (partial hydrolysis product of starch) until the filtrate looked clear. The residue was rinsed with ethanol and dried in an oven at 60° C. The arabinoxylan, covalently linked to the cell wall of de-oiled and de-starched plant materials, was solubilized with a mixture of alkali; 50 g of de-oiled and de-starched plant material was mechanically stirred in 1 L of water, and NaOH (2.0 g) and $Ca(OH)_2$ (1.9 g) were added. The mixture was boiled with good stirring for 1 h. After cooling the reaction mixture was centrifuged at 6000 g for 20 min. and the supernatant was separated by decantation. The alkali insoluble residue (cellulose rich fraction) was re-suspended in 1 L water and stirred by using a mechanical stirrer. The pH was adjusted to 11.5 by adding NaOH. Hydrogen peroxide (30%, 17 mL) was added to the suspension and heated with continued stirring at pH 11.5 and 100° C. temperature for half an hour. During the half hour reaction, the pH was kept at 11.5 by adding more NaOH as needed. After cooling the hot reaction mixture by stirring at room temperature for an additional half hour, it was centrifuged at 6000×g for 20 min and the residue (insoluble cellulosic fraction) was collected. The residue was suspended in water and stirred for 10 minutes. The insoluble material was collected by centrifugation as above. It was re-suspended in water, pH adjusted to 5.5-6.0, and stirred at room temperature for 15 minutes to remove water soluble impurities. The insoluble material was collected by a vacuum filtration. The final white product collected on the funnel was washed 3 times with water, 1 time with 100% ethanol, and dried in a vacuum oven at 50° C. for two days.

Carbohydrate composition and linkage: The sugar composition of IBG samples was determined by following NREL Method (Laboratory Analytical Procedure 2008, Determination of Structural Carbohydrates and Lignin in Biomass). In brief, 0.3 g sample was suspended in 3 mL 72% (w/w) sulfuric acid in a test tube, mixed and incubated at 30° C. for 1 h with stirring at every 5 to 10 minutes. The sample suspension was transferred into a 100 mL Pyrex® glass bottle by using 84 mL water, which also diluted the acid to 2.48%. At this time standard sugars solutions were prepared by taking 0.1 g of each sugar in a Pyrex® bottle and adding 10 mL water and 348 uL 72% sulfuric acid to it, which made final acid concentration 2.42%. The bottles containing samples and standard sugars were capped and placed in an autoclave at 121° C. for 1 h. After cooling to room temperature, an aliquot of 5 ml was taken from each autoclaved sample, its pH was adjusted between 5 and 7 by adding calcium carbonate and centrifuged by using a table top centrifuge at 13,000 rpm for 3.5 minutes to remove the precipitated calcium sulfate. The supernatant was filtered by using an Acrodisc LC 13 mm syringe filter (0.2 µm) to remove any remaining solids and the filtrate was analyzed for sugars by an Agilent 1200 HPLC that included a BioRad Aminex HPX-87H column at 60° C. and a Refractive Index (RI) detector. The mobile phase consisted of isocratic 5 mM $H_2SO_4$ eluant for 25 minutes, followed by a 5 min purge with the same eluant to clean the RI detector to avoid baseline drift prior to the next injection, at a flow rate of 0.6 ml/min. The quantification of each sugar was done by using the calibration curve of standard sugars prepared in the same conditions.

The glycosyl linkage composition was determined by gas chromatography-mass spectrometry (GC-MS) method. For this analysis, the sample was permethylated, depolymerized, reduced and acetylated. The resulted partially methylated alditol acetate (PMAAs) was analyzed by GC-MS as described by York et al., Methods Enzymol., 118, 3-40 (1986).

Water holding capacity: The water holding capacity of IBG was determined according to AACC method 88-04 (AACC, 1995) with some modification. Briefly, 0.5 g IBG sample was weighed in a polypropylene centrifuge tube with screw cap. To each tube, 24.5 mL distilled water were added and the sample was sheared using a high speed polytron at 10,000 rpm for 2 minutes and at 15,000 rpm for 1 minute. The tubes were placed on a shaker at room temperature and shaken at a moderate speed (about 160 rpm) for about 24 hours. Then they were centrifuged at 1,000×g for 15 minutes or 14,000×g for 1 h, excess water decanted, and tubes were inverted to completely decant any residual water. Each tube was weighed. The amount of water held was calculated by subtracting the weight before water treatment and reported as gram of water adsorbed per gram of sample.

Antioxidant activity: Highly reactive molecules like free radicals and reactive oxygen species are generated by normal cellular processes in the body, UV irradiation, and environmental stresses. These reactive molecules react with cellular components damaging DNA, carbohydrates, proteins, and lipids causing injury to cells and tissues. Excess production of such reactive species can cause several diseases including cancer, diabetes, atherosclerosis, etc. Most mammals have antioxidant systems to protect themselves from oxidative stress, however an excess of free radicals and/or reactive oxygen species can cause severe damage. One way to measure the antioxidant power of compositions, foods, and plant phytochemicals is to determine the Oxygen Radical Absorbance Capacity (ORAC) value of the composition. The ORAC antioxidant assay measures the loss of fluorescein fluorescence over time due to peroxyl-radical formation by the breakdown of 2,2-azobis-2-methyl-propanimidamide, dihydrochloride (AAPH). Trolox, which is a water soluble vitamin E analog, serves as a positive control inhibiting fluorescein decay in a dose dependent manner. The ORAC assay is a kinetic assay measuring fluoroescein decay and antioxidant protection over time. The antioxidant activity can be normalized to equivalent Trolox units to quantify the composite antioxidant activity present. This assay measures the material's antioxidant activity by hydrogen atom transfer. Comparatively, the higher the ORAC score in table 4 indicates a greater material's antioxidant capacity. The antioxidant activity was tested by measuring ORAC values by a commercial laboratory using the following published procedures with some modification: Huang, D., et al., J. Agric. Food Chem., 50: 1815-1821 (2002); and Ou, B., et al., J. Agric. Food Chem., 50: 3122-3128 (2002).

Rheological properties: Rheological properties of IBG samples were measured using a rotational rheometer (Anton Paar Modular Compact Rheometer 102, Anton Paar GmbH, Ashland, Va.) with a concentric cylinders geometry. The samples were prepared by shearing 4% w/w suspensions of the IBG in water at 15000 rpm for 3 min followed by 10000 rpm for 2 min using a Polytron mixer (Kinematica Inc., Bohemia, N.Y.). Flow curves of the samples were developed by measuring viscosity at different shear rates (0.13-130 $s^{-1}$). Power Law fitting of the flow curves was carried out, using Microsoft Excel, to determine flow consistency index and flow behavior index.

Table 1 shows the amount of IBG isolated from different plant materials following the scheme given in FIG. 1, varied from 29.80 to 61.94%. The miscanthus had the highest percent (61.94%) of IBG and so it will be a high-yielding feedstock for making it from the commercial point of view. The yield of IBG from all other biomasses was above 40% except for corn bran and barley hulls which produced only about 29.8 and 39.1 wt % product, respectively. Such yield of about 40% or above is considered very high and so these plant materials are very useful for making the biomass gel. However, even though corn bran yielded less than 40% of IBG, its excellent properties and the ability to isolate multiple products (BioFiber Gums, See FIG. 1) during its preparation, may allow it to be produced economically.

Table 2 shows the proximate composition and dietary fiber content of IBG isolated from different plant materials. The ash content of IBG isolated from the given biomasses varied from 1.59 (barley hulls) to 10.25% (sugarcane bagasse). Their protein content was in the range of 0 to 2.45%. Their starch content was less than 1%, showing that they are non-caloric. They were very rich in neutral detergent fiber (84.48 to 99.04%). Most of the fiber present was insoluble dietary fiber with zero or a trace amount of residual soluble dietary fiber in some sample due to presence of some water soluble carbohydrate. It is quite clear from this table that IBG isolated from all these plant materials are essentially pure dietary fiber and will be applicable as a non-caloric ingredient in many food products.

Table 3 shows the term water holding capacity (WHC) which was used to indicate the amount of water that the dietary fiber or any food material can retain. This property varied in the fibers isolated from different sources depending upon its carbohydrate composition, branching and molecular structure. The WHC in dietary fiber is considered to be valuable for many useful applications. The ability of fiber to hold water provides bulk and may cause feeling of satiety without providing any calories. This property of fiber has been proposed to be valuable in the diet to alter stool bulking causing shorter gut transit times limiting exposure of the gut to bile acids and toxins. A fiber with a high WHC is an ideal ingredient to add in many food products to increase its volume without changing its texture and calories. As shown in Table 3, there was a surprising variation in the WHC of IBG depending upon their sources. The usual way to study the water holding behavior of fiber was to dissolve it in water, mix overnight and centrifuge at about 1000×g for a short time (about 15 minutes). But these samples were also tested by centrifuging at a very high speed (14,000×g) for a longer period of time (1 h) to study their capacity to hold water even under very strong conditions for separating water from fiber. The WHC of these fibers varied from 8.03 to 74.33 g/g (water/fiber) by centrifuging them at 1,000×g for 15 minutes and from 4.069 to 11.564 g/g (water/fiber) by centrifuging at a higher speed (14,000×g) for 1 hour. In both conditions, the WHC of IBG from corn bran was surprisingly a lot higher (11.564 and 74.33) than the IBG from all other sources, showing a dramatic difference in their structures and branching. At both "low speed/shorter centrifugation time" and "high speed/longer centrifugation time", the WHC of IBG from rice hulls was very low (4.069 and 8.03 respectively). But the WHC of IBG from other plant materials was in the middle range and very good for many applications in food products.

Antioxidants terminate oxidation reactions in a food matrix or cell by donating hydrogen atoms or electrons, which are called reduction reactions. Phenolic compounds are the main antioxidant coming from the diet that breaks the free radical chain reaction. In this study, the antioxidant activity was measured by the ORAC assay, which is presented in Table 4. The ORAC assay is based on the principle that antioxidant compounds will prevent the production of peroxy-radicals. The ORAC value is a measure of a compound's ability to delay the loss of fluorescence intensity over time in a test solution. IBG isolated from all plant materials still retained a considerable amount of ORAC antioxidant activity in the range of 730 to 2520 μmole Trolox/100 gram sample, suggesting it may contain significant amounts of associated phenolic compounds. The sugar composition, linkages and structural features of these carbohydrate polymers may also influence their antioxidant properties (Lo et al., Carbohydrate Polymers, 86: 320-327 (2010); Chattopadhyay, et al., Food Chemistry, 118: 823-829 (2010); Rao, et al., Phytochemistry, 67: 91-99 (2006)). The arabinose in the side chain and unsubstituted and/or monosubstituted xylose might have antioxidant activities. IBG from barley straw (Haxby MSU, MT) had the highest ORAC value of 2520 μmole Trolox/100 gram. The ORAC values of IBG from corn bran, rice hulls, rice straws, Miscanthus, sugarcane bagasse and all barley straws from MT were higher than 800 μmole suggesting that they may be richer in phenolic compounds than the IBG from remaining sources, which had slightly less than 800 μmole Trolox/100 gram. But overall IBG from all these sources had high enough ORAC values to be considered as a good source of antioxidant agent. Thus the IBG from all these plant materials have the ability to scavenge the free radicals in the diet to which it is added and may help prevent the development of chronic diseases such as cancer, heart disease, stroke, Alzheimer's disease, Rheumatoid arthritis, and cataracts.

Table 5 summarizes the rheological properties of IBG from different biomasses. All the samples showed shear thinning behavior, with viscosity (at shear rate of 1 s$^{-1}$) between 2300-62000 times that of water. Corn fiber IBG showed the highest viscosity, followed by IBG from barley straw and sugarcane bagasse. Corn stover IBG showed the lowest viscosity among those measured, in agreement with its lower water holding capacity as compared to the other three samples, as seen in Table 4.

The Power Law model of rheological behavior was used to fit the flow behavior data. The model describes the flow behavior of the material in terms of the equations below, where σ represents the shear stress, $\dot{\gamma}$ is the shear rate, η is the apparent viscosity and k and n are parameters.

$$\sigma = k\dot{\gamma}^n$$

$$\eta = \frac{\sigma}{\dot{\gamma}} = \frac{k\dot{\gamma}^n}{\dot{\gamma}} = k\dot{\gamma}^{n-1}$$

The parameters of the Power Law model, calculated by fitting the apparent viscosity versus shear rate data, are good indicators of flow behavior of the material. The parameter 'k', which is called the flow consistency index, is a measure of the viscosity of the material at low shear rates, while 'n', which is the flow behavior index indicates how the viscosity changes as shear rate is increased. High values of k indicate that the material is thicker and more viscous at very low shear rates. Flow behavior index (n) values greater than 1 indicate that viscosity increases with shear rate, while values less than 1 indicate shear thinning behavior.

The flow behavior data for each IBG was fitted using the Power Law model, and values of flow consistency index (K) and flow behavior index (n) were calculated (Table 5). Corn fiber IBG showed the highest K value, which is in line with its high apparent viscosity at 1 s$^{-1}$, as discussed before. Also, as expected from the apparent viscosity data, corn stover IBG showed the lowest flow consistency index value. For all the IBG samples, n values were less than 1, indicating shear thinning behavior. The differences between actual values are illustrative of the extent of shear thinning. Corn stover IBG showed the highest n value of 0.26 (and thus smallest decrease in viscosity with increase in shear rate), while the other samples had values around 0.17. This data implies that, while all the different IBGs were capable of providing very high viscosity at low shear rates, the viscosity decreased significantly when the materials encountered very high shear rates, such as during pumping.

Table 6 shows that sugars present in IBG from all biomasses were glucose, xylose and arabinose; this clearly indicates that it was an arabinoxylan containing cellulosic polymer. They contained a very high percentage of total carbohydrate (65.18 to 91.04%) with about 39.27-67.32% glucose, 12.94-24.64% xylose and 1.14-11.48% arabinose. Arabinose and xylose may be present as arabinoxylan polymer with xylan backbone and arabinose in the side chain. The ratio of arabinose to xylose usually indicates the degree of branching, in which a low ratio of arabinose indicates a less branched structure. The amount of arabinose in IBG from corn bran was a lot higher (11.48%) than the IBGs from other biomasses (about 3% or less), showing a highly branched arabinoxylan present in it. Such highly branched structure of corn bran IBG gave very unique and interesting properties for many applications including very high water holding capacity. The major portion of structures of all IBGs was glucose, possibly in the form of cellulose. These cellulose and arabinoxylan polymers present in all IBGs may be very strongly associated or covalently linked together giving a fibrous gel with many interesting properties. It was surprising that these highly purified IBGs were not composed of pure cellulose, which would contain only glucose as the lone neutral sugar component, but the presence of significant amounts of arabinose and xylose showed these polysaccharides are much more complex than cellulose and thus they retained some of the functional properties of arabinoxylans.

Table 7 shows the glycosyl linkage composition of IBG isolated from corn bran, which showed that it had about 62% of (1→4)-linked glucose residue. This finding clearly demonstrated that the major portion of this carbohydrate polymer ha a cellulose like structure. It is also clear that though it had a high percent of glucose, it was not 100% cellulose; it also contained xylose, arabinose and galactose as other sugar residues. It looks like Xylp was present as a (1→4)-linked backbone, which was highly branched on its 2, 3 positions. The total percent of unbranched and branched (1→4) linked Xylp was 16.5% but only 2.5% of Xylp was present in the terminal position. A presence of high percent of arabinose, xylose, galactose and glucose (3.7, 2.5, 1.8 and 6.1% respectively) in the terminal position was a very good indication that it had a very highly branched structure. From these data it was still not clear whether (1→4)-linked Xylp backbone was covalently linked to (1→4)-linked glucose or if it was just very strongly associated due to its highly branched structure, but it is obvious that IBG contained a mixture of glucose- and xylose-rich polymers which are very branched and also some other arabinose, xylose, galactose and glucose present in its side chains and terminal positions.

We have thus provided a new simple way to make IBG from many plant sources. The yield of IBG from various biomasses was high, varying from about 30 to 62% on a dry weight basis. The product was white to off white in color as it was bleached with hydrogen peroxide. The product had very high water holding capacity, and it made a highly viscous solution at low concentrations and showed a shear thinning behavior, making it easy to pump as needed for many applications. It became more viscous with increased shear. It is stable over a wide range of temperatures, it was stable in pH extremes, and it was stable in brine and salt environments. The product contained glucose polymer, but it was not like cellulose rather it was a highly branched structure with many sugars at the terminal position. It also contained arabinoxylan, which may be either strongly associated or covalently linked to glucose polymer. It was rich in indigestible carbohydrates with very low starch, which made it a rich source of insoluble dietary fiber. It retained a considerable amount of antioxidant capacity present in the original plant biomass All of the references cited herein, including U.S. Patents, are incorporated by reference in their entirety.

Thus, in view of the above, there is described (in part) the following:

A process for the preparation of an insoluble biomass gel comprising (or consisting essentially of or consisting of):

(a) mixing ground agricultural materials and hexane to produce de-oiled agricultural materials, (b) treating said de-oiled agricultural materials with thermostable α-amylase to produce de-oiled and de-starched agricultural materials, (c) mixing alkali with said de-oiled and de-starched agricultural materials to produce a first residue, (d) mixing hydrogen peroxide with said first residue to form a second residue, and (e) mixing said second residue in water and collecting an insoluble material which is an insoluble biomass gel.

The above process, comprising (or consisting essentially of or consisting of):

(a) mixing ground agricultural materials and hexane at room temperature for about one hour followed by filtering to produce de-oiled agricultural materials, (b) treating said de-oiled agricultural materials with thermostable α-amylase at a temperature of about 90° to about 95° C. and at a pH of about 6.5 for about 1 hour followed by filtering to produce de-oiled and de-starched agricultural materials, (c) mixing alkali with said de-oiled and de-starched agricultural materials at a pH of about 11.5 and at a temperature of about 100° C. for about 1 h, cooling to room temperature, centrifuging at about 6000×g for about 20 minutes to produce a supernatant and a residue to produce a first residue, (d) mixing hydrogen peroxide with said first residue to form a second residue at a pH of about 11.5 and a temperature of about 100° C. for about half hour, centrifuging at about 6000×g for about 20 minutes to produce a second supernatant and a second residue, (e) mixing said second residue in water and adjusting the pH to about 5.5 to about 6 at room temperature for about 15 minutes and collecting an insoluble material which is an insoluble biomass gel.

The above process, wherein said alkali are selected from the group consisting of KOH, $NH_4OH$, NaOH, $Ca(OH)_2$, and mixtures thereof. The above process, wherein said alkali are NaOH and $Ca(OH)_2$.

An insoluble biomass gel produced by the above process.

An edible formulation, comprising (or consisting essentially of or consisting of) an insoluble biomass gel produced by the above process, wherein said insoluble biomass gel functions as bulking agents in the edible formulation.

A method of stabilizing (preventing oil droplets from colliding with each other (coalescence) to form larger droplets and separate from the solution making oily layer at the top) an emulsion, comprising (or consisting essentially of or consisting of) mixing an effective stabilizing amount of an insoluble biomass gel produced by the above process with an emulsion to stabilize said emulsion.

A method of increasing the bulk of a composition, comprising (or consisting essentially of or consisting of) mixing an effective bulk increasing amount of an insoluble biomass gel produced by the above process with a composition to increase the water holding capacity of said composition.

A method of increasing the water holding capacity of a composition, comprising (or consisting essentially of or consisting of) mixing an effective water holding increasing amount of an insoluble biomass gel produced by the above process with a composition to increase the water holding capacity of said composition.

A method of increasing the viscosity of a composition, comprising (or consisting essentially of or consisting of) mixing an effective viscosity increasing amount of an insoluble biomass gel produced by the above process with a composition to increase the viscosity of said composition.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

IBG Isolated from Plant Materials
(% Yield, dry weight basis)[a]

| IBF Sources | % Yield |
| --- | --- |
| Corn bran | 29.8 |
| Corn stover | 48.37 |
| Rice hulls | 58.81 |
| Rice straws | 43.36 |
| Switch grass | 54.08 |
| Miscanthus | 61.94 |
| Sugarcane bagasse | 51.23 |

TABLE 1-continued

IBG Isolated from Plant Materials
(% Yield, dry weight basis)[a]

| IBF Sources | % Yield |
|---|---|
| Barley hulls[b] | 39.10 |
| Barley straws (Samples/Varieties/Locations) | |
| Unknown, HHF[c], PA | 55.91 |
| Thoroughbred, VCIA[d], VA | 54.60 |
| WCC 100, MSU[e], MT | 40.60 |
| WCC 129 MSU, MT | 50.84 |
| WCC 151 MSU, MT | 47.48 |
| Haxby MSU, MT | 48.53 |
| Hays, MSU, MT | 46.77 |

[a] Weight percent based on the de-oiled and de-starched biomass;
[b] Thoroughbred—Osage Bio-Energy, VA
[c] Heidel Hollow Farms;
[d] Virginia Crop Improvement Association;
[e] Montana State University

TABLE 2

Proximate Composition and Dietary Fiber Content of IBG Isolated from Plant Materials (d.w.b.)

| | Ash | Protein | Starch | NDF | ISD | SDF | TDF |
|---|---|---|---|---|---|---|---|
| CRF Sources | | | | | | | |
| Corn bran | 2.15 | 2.12 ± 0.03 | 0.80 | 99.04 | 95.77 | 0.33 | 96.10 |
| Corn stover | 8.81 | 0.073 ± 0.02 | 0.13 | 96.48 | 90.19 | 0.00 | 90.19 |
| Rice hulls | 5.69 | 1.42 ± 0.01 | 0.28 | ND | 88.55 | 0.00 | 88.55 |
| Rice straws | 6.39 | 1.27 ± 0.00 | 0.39 | 92.81 | 93.75 | 0.00 | 93.75 |
| Switch grass | 2.81 | 0.00 ± 00 | 0.20 | 95.07 | 95.51 | 0.95 | 96.46 |
| Miscanthus | 2.78 | 0.00 ± 00 | 0.25 | ND | 95.20 | 2.11 | 97.30 |
| Sugarcane bagasse | 10.25 | 0.00 ± 0.0 | 0.18 | 92.73 | 88.48 | 0.00 | 88.48 |
| Barley hulls[b] | 1.59 | 0.47 ± 0.0 | 0.23 | ND | 96.39 | 0.00 | 96.39 |
| Barley straws, Samples/Varieties/Locations) | | | | | | | |
| Thoroughbred, VCIA[d], VA | 2.13 | 0.00 ± 00 | 0.12 | 98.22 | 95.69 | 0.00 | 95.69 |
| WCC 100, MSU[e], MT | 8.73 | 0.74 ± 0.29 | 0.26 | 84.48 | 85.13 | 2.44 | 87.25 |
| WCC 129 MSU, MT | | 0.99 ± 0.25 | ND | ND | ND | ND | ND |
| WCC 151 MSU, MT | | 1.58 ± 0.65 | ND | ND | ND | ND | ND |
| Haxby MSU, MT | | 1.02 ± 0.47 | ND | ND | ND | ND | ND |
| Hays, MSU, MT | | 2.45 ± 0.16 | ND | ND | ND | ND | ND |

[a] Weight percent based on the de-oiled and de-starched biomass;
[b] Thoroughbred- Osage Bio-Energy, VA
[c] Heidel Hollow Farms;
[d] Virginia Crop Improvement Assoc.;
[e] Montana State U.

TABLE 3

Water Holding Capacity of IBG Isolated from Plant Materials

| | Water Held/Sample (g/g) (Centrifugation, 14,000 × g, 1 h) | Water Held/Sample (g/g) (Centrifugation, 1500 × g, 15 min.) |
|---|---|---|
| Corn bran | 11.564 ± 0.504 | 74.33 ± 4.52 |
| Corn stover | 7.789 ± 0.239 | 17.36 ± 1.57 |
| Rice hulls | 4.069 ± 0.150 | 8.03 ± 0.61 |
| Rice straws | 6.324 ± 0.149 | 18.64 ± 1.20 |
| Switch grass | 7.828 ± 0.0.078 | 19.50 ± 0.33 |
| Miscanthus | 6.891 ± 0.130 | 8.25 |
| Sugarcane bagasse | 7.198 ± 0.367 | 21.73 ± 0.27 |
| Barley hulls[b] | 7.519 ± 0.487 | 12.59 ± 0.82 |
| Barley straws (Samples/Varieties/Locations) | | |
| Unknown, HHF[c], PA | 8.632 ± 0.451 | ND |
| Thoroughbred, VCIA[d], VA | 9.565 ± 0.217 | 20.67 ± 0.68 |
| WCC 100, MSU[e], MT | 9.234 ± 0.085 | 20.20 ± 0.60 |
| WCC 129 MSU, MT | 8.456 ± 0.001 | 17.2464 ± 0.12 |
| WCC 151 MSU, MT | 8.051 ± 0.064 | 11.19 |
| Haxby MSU, MT | 10.205 ± 0.723 | 12.18 |

TABLE 4

ORAC Value of IBG Isolated from Plant Materials

| CRF Sources | ORAL Value (μmole Trolox/100 gram) |
|---|---|
| Corn bran | 810 |
| Corn stover | 738 |
| Rice hulls | 947 |
| Rice straws | 957 |
| Switch grass | 756 |
| Miscanthus | 1070 |
| Sugarcane bagasse | 842 |
| Barley hulls[b] | 730 |
| Barley straws (Samples/Varieties/Locations) | |
| Thoroughbred, VCIA[d], VA | 785 |

TABLE 4-continued

ORAC Value of IBG Isolated from Plant Materials

| CRF Sources | ORAL Value (μmole Trolox/100 gram) |
|---|---|
| WCC 100, MSU[e], MT | 1330 |
| WCC 129 MSU, MT | 916 |
| Haxby MSU, MT | 2520 |
| Hays, MSU, MT | 830 |

TABLE 5

Rheological properties of 4 wt % IBO suspensions isolated from various biomasses

| | Apparent viscosity at shear rate of 1 s$^{-1}$ (cP) | Flow consistency index "K" (Pa · s") | Flow behavior index (n) |
|---|---|---|---|
| Corn bran | 62800 | 77.56 | 0.17 |
| Barley straw | 7980 | 11.59 | 0.17 |
| Corn stover | 2370 | 3.43 | 0.26 |
| Sugarcane baggase | 5820 | 7.40 | 0.16 |

TABLE 6

Carbohydrate Composition of IBG Isolated from Plant Materials

| | Sugar Content (Wt. %) | | | |
|---|---|---|---|---|
| CRF Sources | Glucose | Xylose | Arabinose | Total |
| Corn fiber | 54.92 | 24.64 | 11.48 | 91.04 |
| Corn stover | 67.32 | 15.18 | 1.39 | 83.89 |
| Rice hulls | 48.31 | 16.83 | 2.15 | 67.30 |
| Rice straws | 57.18 | 19.75 | 2.77 | 79.70 |
| Switch grass | 64.03 | 18.38 | 2.02 | 84.42 |
| Miscanthus | 58.86 | 16.17 | 1.48 | 76.50 |
| Sugarcane bagasse | 64.35 | 16.14 | 1.45 | 81.94 |
| Barley hulls[b] | 64.10 | 17.53 | 2.71 | 84.34 |
| Barley straws (Samples/Varieties/Locations) | | | | |
| Unknown, HHF[e], PA | 59.46 | 15.68 | 1.44 | 76.58 |
| Thoroughbred, VCIA[d], VA | 59.53 | 14.67 | 1.14 | 75.34 |
| WCC 100, MSU[e], MT | 64.08 | 12.94 | 1.23 | 78.25 |
| WCC 129 MSU, MT | 39.27 | 22.63 | 3.28 | 65.18 |
| WCC 151 MSU, MT | 63.62 | 16.01 | 1.83 | 81.47 |
| Haxby MSU, MT | 60.95 | 14.73 | 1.61 | 77.29 |
| Hays, MSU, MT | 60.59 | 14.55 | 1.57 | 76.70 |

TABLE 7

Glycosyl-linkage composition of IBG isolated from corn fiber

| Glycosyl residue linkage | Relative peak area (%) |
|---|---|
| t-Araf (terminally linked arabinofuronosyl residue) | 8.1 |
| t-Xylp (terminally linked xylopyranosyl residue) | 2.5 |
| 2-Araf (2-linked arabinofuranosyl residue) | 1.0 |
| t-Man (terminally linked mannopyranosyl residue) | 0.2 |
| t-Glc (terminally linked glucopyranosyl residue) | 6.1 |
| 3-Araf (3-linked arabinofuronosyl residue) | 0.7 |
| t-Gal (terminally linked galactopyranose residue) | 1.8 |
| 3-Xylp & 4-Arap or 5-Araf (3-linked xylopyranose residue & 4-linked arabinopyranose residue or 5-linked arabinofuranose residue) | 0.7 |
| 4-Xelp (4-linked xylopyranosyl residue) | 5.1 |
| 3-Glc (3-linked glucopyranosyl residue) | 0.9 |
| 4-Man (4-linked mannopyranosyl residue) | 1.5 |
| 6-Glc (6-linked glucopyranosyl residue) | 0.3 |
| 4-Gal (4-linked galactopyransyl residue) | ND |
| 4-Gal (4-linked glucopyranosyl residue) | 58.8 |
| 3,4-Xylp (3,4-linked xylopyranosyl residue) | 8.4 |
| 3,4-Glc (3,4-linked glucopyranosyl residue) | 0.6 |
| 2,4-Glc (4-linked glucopyranosyl residue) | 0.2 |
| 4,6-Glc (4,6-linked glucopyranosyl residue) & 2,3,4-Xylp (2,3,4-linked xylopyranosyl residue) | 3.0 |
| Total | 100.0 |

We claim:

1. A process for the preparation of an insoluble biomass gel, the process comprising:
   (a) mixing ground corn bran and hexane to produce a de-oiled corn bran,
   (b) treating said de-oiled corn bran with thermostable α-amylase to produce a de-oiled and de-starched corn bran,
   (c) mixing alkali with said de-oiled and de-starched corn bran to produce a first residue,
   (d) mixing hydrogen peroxide with said first residue to form a second residue, and
   (e) mixing said second residue in water and collecting the insoluble biomass gel;
   wherein said insoluble biomass gel contains (i) protein, (ii) xylose and arabinose in the form of a branched arabinoxylan polymer with a β-1,4 linked xylan backbone, and (iii) glucose polymer present in an amount greater than both said xylose and said arabinose.

2. The process according to claim 1, comprising:
   (a) mixing ground corn bran and hexane at room temperature for about one hour followed by filtering to produce de-oiled corn bran,
   (b) treating said de-oiled corn bran with thermostable α-amylase at a temperature of about 90° C. to about 95° C. and at a pH of about 6.5 for about 1 hour followed by filtering to produce de-oiled and de-starched corn bran,
   (c) mixing alkali with said de-oiled and de-starched corn bran at a pH of about 11.5 and at a temperature of about 100° C. for about 1 h, cooling to room temperature, centrifuging at about 6000×g for about 20 minutes to produce a supernatant and a residue to produce the first residue,
   (d) mixing hydrogen peroxide with said first residue to form the second residue at a pH of about 11.5 and a temperature of about 100° C. for about 1 h, centrifuging at about 6000×g for about 20 minutes to produce a second supernatant and the second residue, and
   (e) mixing said second residue in water and adjusting the pH to about 5.5 to about 6 at room temperature for about 15 minutes and collecting the insoluble biomass gel.

3. The process according to claim 1, wherein said alkali are selected from the group consisting of KOH, NH$_4$OH, NaOH, Ca(OH)$_2$, and mixtures thereof.

4. The process according to claim 1, wherein said alkali are NaOH and Ca(OH)$_2$.

5. The process according to claim 1, wherein said insoluble biomass gel is an antioxidant with an oxygen radical absorbance capacity of at least 810 μmole Trolox/100 gram insoluble biomass gel.

6. The process according to claim 1, wherein said insoluble biomass gel contains the following glycosyl residue linkages:
t-Araf (terminally linked arabinofuranosyl residue),
t-Xylp (terminally linked xylopyranosyl residue),
2-Araf (2-linked arabinofuranosyl residue),
t-Glc (terminally linked glucopyranosyl residue),
t-Gal (terminally linked galactopyranose residue),
4-Xylp (4-linked xylopyranosyl residue),
4-Glc (4-linked glucopyranosyl residue),
3,4-Xylp (3,4-linked xylopyranosyl residue), and
4,6-Glc (4,6-linked glucopyranosyl residue) and 2,3,4-Xylp (2,3,4-linked xylopyranosyl residue).

7. The process according to claim 1, wherein said insoluble biomass gel contains the following glycosyl residue linkages:
t-Araf (terminally linked arabinofuranosyl residue),
t-Xylp (terminally linked xylopyranosyl residue),
2-Araf (2-linked arabinofuranosyl residue),
t-Glc (terminally linked glucopyranosyl residue),
3-Araf (3-linked arabinofuranosyl residue),
t-Gal (terminally linked galactopyranose residue),
3-Xylp and 4-Arap or 5-Araf (3-linked xylopyranose residue and 4-linked arabinopyranose residue or 5-linked arabinofuranose residue),
4-Xylp (4-linked xylopyranosyl residue),
3-Glc (3-linked glucopyranosyl residue),
6-Glc (6-linked glucopyranosyl residue),
4-Glc (4-linked glucopyranosyl residue),
3,4-Xylp (3,4-linked xylopyranosyl residue),
3,4-Glc (3,4-linked glucopyranosyl residue),
2,4-Glc (2,4-linked glucopyranosyl residue), and
4,6-Glc (4,6-linked glucopyranosyl residue) and 2,3,4-Xylp (2,3,4-linked xylopyranosyl residue).

8. The process according to claim 1, wherein said insoluble biomass gel contains about 2.12% dry weight basis protein.

9. The process according to claim 1, wherein said insoluble biomass gel contains about 54.92 wt. % glucose, about 24.64 wt. % xylose, and about 11.48 wt. % arabinose.

10. The process according to claim 1, wherein said process consists essentially of:
(a) mixing corn bran and hexane to produce de-oiled corn bran,
(b) treating said de-oiled corn bran with thermostable α-amylase to produce de-oiled and de-starched corn bran,
(c) mixing alkali with said de-oiled and de-starched corn bran to produce the first residue,
(d) mixing hydrogen peroxide with said first residue to form the second residue, and
(e) mixing said second residue in water and collecting the insoluble biomass gel;
wherein said insoluble biomass gel contains (i) protein, (ii) xylose and arabinose in the form of a branched arabinoxylan with a β-1,4 linked xylan backbone, and (iii) glucose polymer present in an amount greater than both said xylose and said arabinose.

11. The process according to claim 1, wherein said process consists of:
(a) mixing corn bran and hexane to produce de-oiled corn bran,
(b) treating said de-oiled corn bran with thermostable α-amylase to produce de-oiled and de-starched corn bran,
(c) mixing alkali with said de-oiled and de-starched corn bran to produce the first residue,
(d) mixing hydrogen peroxide with said first residue to form the second residue, and
(e) mixing said second residue in water and collecting the insoluble biomass gel;
wherein said insoluble biomass gel contains (i) protein, (ii) xylose and arabinose in the form of a branched arabinoxylan with a β-1,4 linked xylan backbone, and (iii) glucose polymer present in an amount greater than both said xylose and said arabinose.

12. A process for the preparation of an insoluble biomass gel, the process comprising:
(a) mixing ground corn bran and hexane to produce a first residue containing a de-oiled corn bran,
(b) removing said hexane from said first residue,
(c) treating said first residue with thermostable α-amylase to produce a second residue
(d) washing said second residue to remove maltodextrin,
(e) mixing alkali with said second residue from step (d) to produce a third residue,
(f) mixing hydrogen peroxide with said third residue to form a fourth residue, and
(g) mixing said fourth residue in water and collecting the insoluble biomass gel;
wherein said insoluble biomass gel contains (i) protein, (ii) xylose and arabinose in the form of a branched arabinoxylan polymer with a β-1,4 linked xylan backbone, and (iii) glucose polymer present in an amount greater than both said xylose and said arabinose.

* * * * *